United States Patent [19]

Yabumoto et al.

[11] Patent Number: 4,842,831

[45] Date of Patent: Jun. 27, 1989

[54] CHLORINE HYDRATE TANK

[75] Inventors: Toshiaki Yabumoto; Kunihiko Fujiwara, both of Yokohama, Japan

[73] Assignee: The Furukawa Electric Co., Ltd., Tokyo, Japan

[21] Appl. No.: 56,361

[22] Filed: May 28, 1987

Related U.S. Application Data

[63] Continuation of Ser. No. 590,684, Mar. 19, 1984, abandoned.

[30] Foreign Application Priority Data

Mar. 26, 1983 [JP] Japan ................... 58-50744

[51] Int. Cl.⁴ .............. C01B 11/04; H01M 2/38; H01M 8/04
[52] U.S. Cl. .................... 422/198; 422/162; 422/227; 422/231; 423/472; 429/14; 429/20; 429/51
[58] Field of Search ............... 422/162, 198, 224, 227, 422/230, 231; 423/462, 472; 429/14, 19, 20, 51

[56] References Cited

U.S. PATENT DOCUMENTS

| | | |
|---|---|---|
| 1,000,689 | 8/1911 | Paterson ........................ 422/224 |
| 1,054,629 | 2/1913 | Warwick ....................... 422/224 |
| 1,082,797 | 12/1913 | Bretherton .................... 422/224 |
| 2,676,167 | 4/1954 | Findlay et al. ................ 422/198 |
| 2,687,948 | 8/1954 | Gregory et al. .............. 422/230 |
| 2,731,456 | 1/1956 | Weedman ..................... 422/273 |
| 3,524,731 | 8/1970 | Effron et al. .................. 422/195 |
| 3,759,669 | 9/1973 | Aaron et al. .................. 422/231 |
| 3,809,578 | 5/1974 | Symons ........................... 429/51 |

FOREIGN PATENT DOCUMENTS

| | | |
|---|---|---|
| 93348 | 11/1967 | France . |
| 2169789 | 9/1973 | France . |
| 171366 | 5/1965 | U.S.S.R. . |

Primary Examiner—Barry S. Richman
Assistant Examiner—Lynn Kummert
Attorney, Agent, or Firm—Frishauf, Holtz, Goodman & Woodward

[57] ABSTRACT

In a chlorine hydrate tank wherein a chlorine gas supply pipe is inserted into a tank holding chilled water therein and chlorine gas in blown into the water through the pipe to form a chlorine hydrate, a hollow cylinder having an opening in an upper-side portion thereof is arranged around the chlorine gas supply pipe so as to form a predetermined gap therebetween so that the upper opening of the cylinder is partially or entirely submerged in the water.

5 Claims, 2 Drawing Sheets

CHLORINE HYDRATE TANK

This is a continuation of application Ser. No. 590,684, filed Mar. 19, 1984, now abandoned.

BACKGROUND OF THE INVENTION

The present invention relates to an improvement in a chlorine hydrate tank for efficiently forming or synthesizing chlorine hydrate and storing the formed chlorine hydrate, as a storage form of chlorine.

In general, chlorine hydrate is a clathrate compound wherein a chlorine molecule is enclosed within 48 water molecules and has a general formula: $Cl_2 \cdot xH_2O$ (where $x = 6$ to 8). Chlorine hydrates can be stably stored if kept at temperatures below 9.6° C. and at normal pressure. Thus, chlorine hydrates are good means of storing chlorine. Synthesis of chlorine hydrate is an exothermic reaction (80 cal/g). Thus, in order to form a chlorine hydrate efficiently, the heat of reaction must be quickly removed. In view of this, according to a conventional method, chlorine and chilled water at 9.6° C. or lower are mixed and directly reacted together to form chlorine hydrate. However, it is extremely difficult to obtain efficient absorption of chlorine gas into chilled water. An improvement in the yield of chlorine hydrate is demanded.

In some cased, a small amount of zinc chloride, sodium chloride or potassium chloride is dissolved in chilled water. In such cases, the formed chlorine hydrate is not deposited on a cooling heat exchanger in the chlorine hydrate tank, and thus the operation capacity of the heat exchanger is maintained. The solution temperature is generally kept at 8° C. or lower.

An example of means for storing chlorine will be described with reference to a case of a zinc-chloride battery. FIG. 1 shows a conventional charging mechanism of a zinc-chloride battery. Referring to FIG. 1, chlorine gas generated by a chlorine electrode in a battery 1 is blown into a chlorine hydrate tank 4 by a gas pump 2 through a chlorine gas supply pipe 3. The chlorine gas in the tank 4 reacts with chilled water 6 held therein and chilled by a heat exchanger 5 so as to form chlorine hydrate 7. The nonreacted portion of the chlorine gas is supplied to a nonreacted gas circulation pipe 16 where it is recirculated for further reaction as indicated by the arrow.

Zinc chloride electrolyte held in an electrolyte tank 8 is supplied to the battery 1 and is recirculated therebetween by a pump 9.

FIG. 2 shows an example of a chlorine hydrate tank for mixing chlorine with chilled water to form chlorine hydrate. In this chlorine hydrate tank, chlorine is blown into chilled water 6 in a chlorine hydrate tank 4 through a chlorine gas supply pipe 3. This tank can only provide a very low reaction rate between the chilled water and chlorine gas. Therefore, it has been proposed to use an agitator so that the chilled water is agitated while chlorine is blown into the chilled water. However, it is difficult to agitate the chilled water uniformly at all times and power is required for agitation.

Furthermore, when a large amount of chlorine hydrate 7 is formed, as shown in FIG. 3, the chlorine hydrate has a high specific gravity and therefore precipitates on the bottom of the chlorine hydrate tank 4. The precipitated chlorine hydrate frequently clogs the distal end of the chlorine gas supply pipe 3 thus preventing further synthesis of chlorine hydrate.

Another method which uses a gear pump has also been proposed. According to this method, chlorine and chilled water are drawn into the gear pump through inlet ports thereof and are mixed therein. The pump then delivers the synthesized chlorine hydrate. This method provides a high mixing efficiency and a high yield of chlorine hydrate. However, when the produced chlorine hydrate is drawn into the pump, the interior of the chilling tank is kept at a reduced pressure. This causes decomposition of the chlorine hydrate and thus reduces the overall yield thereof. In order to prevent this, a filter for separating out the chlorine hydrate is required, resulting in a complex structure. In addition, power for driving the pump is required. Since chlorine-containing water is strongly corrosive, only titanium can be used as a material of the pump, rendering an expensive pump necessary.

SUMMARY OF THE INVENTION

The present invention has been proposed based on the studies made in an attempt to provide a chlorine hydrate tank which gives a high yield of chlorine hydrate and which can operate at a reduced drive power.

According to the present invention, there is provided a chlorine hydrate tank in which a chlorine gas supply pipe is inserted into a tank holding chilled water or a chilled aqueous chloride solution, and chlorine is blown into the chilled water or the chilled aqueous chloride solution through the chlorine gas supply pipe to form a chlorine hydrate, wherein a hollow cylinder with openings at upper and lower portions thereof is arranged around the chlorine gas supply pipe to form a predetermined gap therebetween so that the upper opening of the hollow cylinder is partially or entirely submerged in the chilled water or the chilled aqueous chloride solution.

DETAILED DESCRIPTION OF THE PREFERRED EMBODIMENTS

Figure 1:
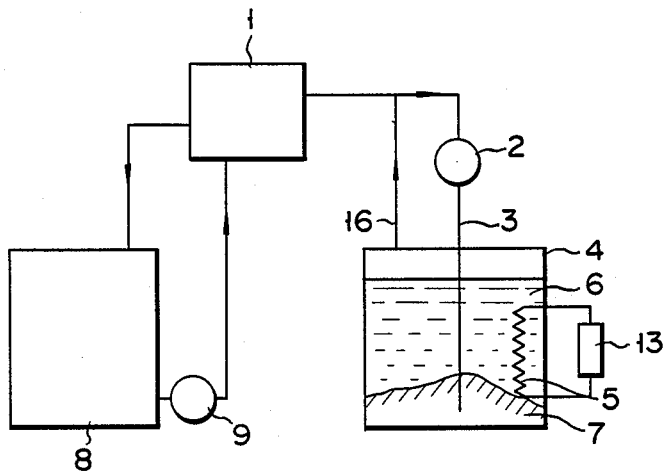
FIG. 1 is a representation of a chlorine hydrate tank with zinc-chloride battery for explaining the operation state thereof.
Figure 2:
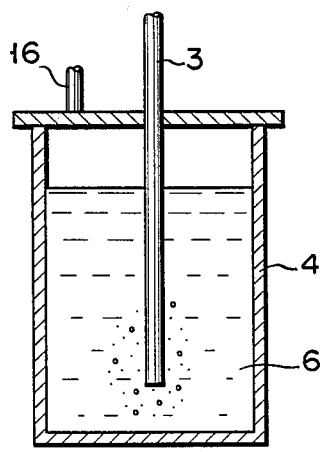
FIG. 2 is a schematic explanatory view of a conventional chlorine hydrate tank.
Figure 3:
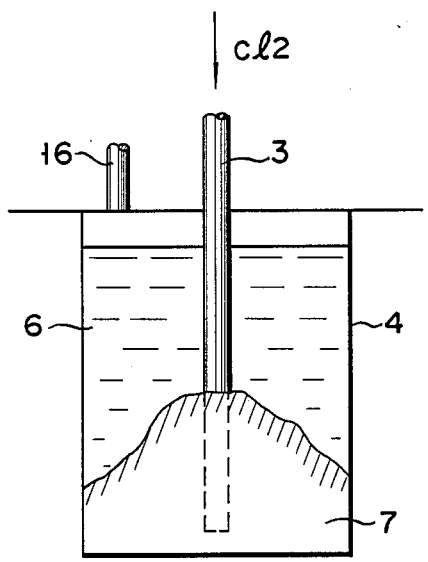
FIG. 3 is a representation of the forming state of a chlorine hydrate in the conventional chlorine hydrate tank.
Figure 4:
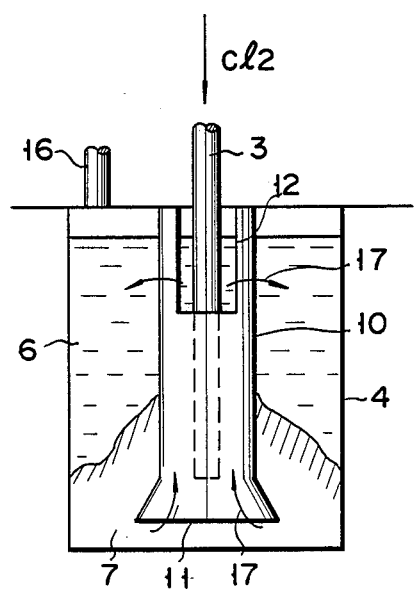
FIG. 4 is a schematic explanatory view of a chlorine hydrate tank according to the present invention.

According to a chlorine hydrate tank 4 of the present invention shown in FIG. 4, when chlorine gas is blow into chilled water 6 or a chilled dilute aqueous solution of zinc chloride 6, or the like, through a chlorine gas supply pipe 3 arranged inside a hollow cylinder 10 having an upper opening 12 and a lower opening 11, the water or solution inside the hollow cylinder 10 absorbs chlorine. Thereafter, the portion of the water or solution inside the hollow cylinder 10 has a specific gravity smaller than that of the position of the water or solution outside the hollow cylinder. Then, due to this difference of specific gravities, an upward convection is established in the solution inside the hollow cylinder 10 without requiring any special drive means except one for blowing the chlorine gas. In the chloride hydrate tank 4 of the present invention shown in FIG. 4, an agitation effect is obtained by the upward convection of the water or solution indicated by an arrow 17. In this case, the chlorine hydrate yield is improved, as compared with that in the conventional chlorine hydrate tank wherein chlorine gas is simply blown through the chlorine gas supply pipe 3, as shown in FIG. 2.

The convection also allows chilled water or solution to be constantly supplied to the position near the distal end of the chlorine gas supply pipe 3, which is the reaction site of chlorine hydrate synthesis. Therefore, the heat of reaction accompanying chlorine hydrate synthesis is immediately removed. Since this heat of reaction which inhibits the exothermic synthesis of chlorine hydrate is removed immediately after it is generated, the yield of chlorine hydrate 7 is further improved. When the hollow cylinder 10 is incorporated in the tank, the flow of water or solution below the pipe 3 becomes fast, thus preventing precipitation of chlorine hydrate 7 near the distal end of the pipe 3. Then, even after a large amount of chlorine hydrate 7 has been formed, the chlorine gas supply pipe 3 will not become clogged, allowing continuous and highly efficient synthesis of chlorine hydrate to be performed.

Figure 5:
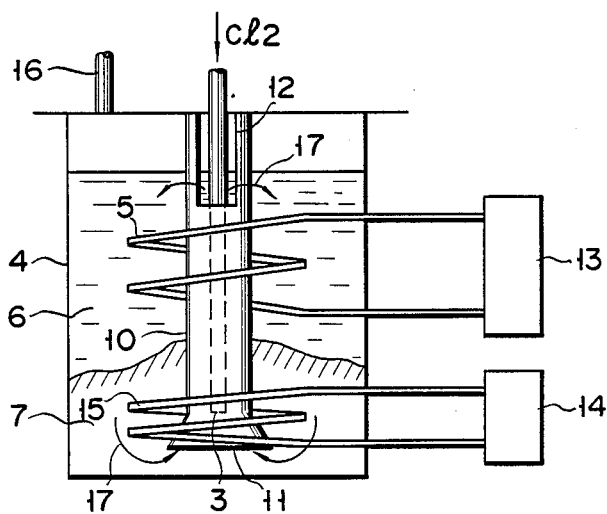
FIG. 5 is a representation showing positions of heat exchangers in the chlorine hydrate tank of the present invention.

Referring to FIG. 5, a heat exchanger 5 for cooling is arranged around an opening 12 formed at the upper portion of the hollow cylinder 10, that is, at the upper portion of the tank 4. The heat exchanger 5 cools the mixture of chlorine and chilled water or solution 6 so as to remove the heat of reaction, thereby further improving the yield of chlorine hydrate 7. Reference numeral 13 denotes a cooling device. Even after a large amount of chlorine hydrate is formed, the heat exchanger 5 at the upper portion of the tank is not emersed in the formed chlorine hydrate 7. Thus, the heat exchanger 5 maintains stable cooling operation and hence stable chlorine hydrate synthesis. The synthesized chlorine hydrate 7 can be used for storing chlorine or can be decomposed, when required, to give a supply of chlorine. In order to allow alternate formation and decomposition of chlorine hydrate within a single chlorine hydrate tank, a heat exchanger 15 for heating is arranged near the bottom of the tank, as shown in FIG. 5. Warm water or warm aqueous solution is externally supplied to the heat exchanger 15 so as to heat the chlorine hydrate tank 4.

The heat exchangers for cooling and heating must both be made of a chlorine-resistant material such as titanium, tantalum, or a flourine-containing resin (e.g., tetrafluoroethylene). Referring to FIG. 5, reference numeral 14 denotes a heater.

The heat exchanger for heating is used for decomposing the chlorine hydrate and can be arranged at any position inside the chlorine hydrate tank. However, a better result is obtained if the heating heat exchanger is arranged at a lower portion of the tank.

The heat exchanger for heating, as it is arranged at a lower portion of the tank, in the chlorine storage state, is emersed in the chlorine hydrate. When warm water or warm aqueous solution is supplied to this heat exchanger 15, therefore, chlorine hydrate decomposition can be immediately started on the surface of the heat exchanger 15, thereby producing chlorine. Accordingly, chlorine can be supplied without maintaining the overall water or solution in the chlorine hydrate tank at a temperature higher than 9.6° C., at which chlorine hydrate decomposes.

The present invention will now be described by way of examples. Examples 1 and 2

As shown in FIG. 4, chilled water 6 at 8° C. (Example 1) or 3% zinc chloride aqueous solution 6 at 7° C. (Example 2) was injected into a chlorine hydrate tank 4 having a height of 400 mm and a volume of 100 l through a heat exchanger (not shown). A chlorine gas supply pipe 3 of 13 mm inner diameter and 350 mm height and of polyvinyl chloride was mounted in each tank 4. A hollow cylinder 10 of 40 mm inner diameter and 365 mm height was arranged around the pipe 3. The cylinder 10 had a funnel-like enlarged opening 11 at its lower end, and an opening 12 of about 30 mm in length at its upper side surface, and had its lower half submerged in the water or solution 6.

When chlorine gas was blown into the water or solution at a rate of 3.5 l/min. through the chlorine gas supply pipe 3, the chlorine gas was made to flow upward inside the hollow cylinder 10 while it reached with the water or solution. Thus, since the portion of the water or solution inside the hollow cylinder 10 contained a large amount of chlorine gas, it had a smaller specific gravity than that portion of the water or solution which was outside the cylinder 10. This portion of the water or solution inside, which had a smaller specific gravity, flowed out of the cylinder 10 through the opening 12 at the upper side surface thereof, causing the natural convection as indicated by arrow 17. Thus, chlorine and the water or solution were efficiently mixed and the yield of chlorine hydrate was improved. When this experiment was continued for 8 hours, the increase in pressure inside the tank 4 was 0.1 kg/cm$^2$ or less in both cases. This indicates that most of the chlorine gas has been converted into a chlorine hydrate and thus the yield of the chlorine hydrate was extremely improved. Although the lower end of the hollow cylinder 10 need not have a funnel-like shape, it preferably has such a funnel-like shape to facilitate the convection flow.

For the purpose of comparison, chlorine gas was blown into chilled water or zinc chloride aqueous solution in the same manner to that described above, using the tank shown in FIG. 2. In this case, the pressure inside the tank 4 increased to 0.3 kg/cm$^2$ after the reaction had proceeded for 3 hours. This indicates that the yield of chlorine hydrate was low.

In the present invention, the opening need not be formed at the side surface of the hollow cylinder, but can be formed at an upper portion thereof and two or more openings can be formed. However, in either case, at least the lower portion of each opening must be submerged in the water or solution.

A chlorine hydrate tank of the present invention can efficiently synthesize chlorine hydrate.

What is claimed is:

1. In a chlorine hydrate tank wherein a chlorine gas supply pipe is inserted inside a tank holding chilled water therein for injecting chlorine gas at a given rate into the water from means defining an opening in a distal end of the chlorine gas supply pipe to form a chlorine hydrate. the improvement comprising, in combination:

a hollow cylinder having means defining an upper opening and a lower opening, chlorine gas supply pipe being positioned and arranged in the upper opening of the hollow cylinder and having distal end extending toward the lower opening of the hollow cylinder, said hollow cylinder being positioned and arranged coaxially around and radially spaced from the chlorine gas supply pipe;

means for supporting said hollow cylinder so that the upper opening of the hollow cylinder is at least partially submerged in the water and the lower opening of said hollow cylinder receives the chlorine gas from the distal end of the gas supply pipe for reacting the chlorine gas with chilled water to form solid chlorine hydrate crystals;

said hollow cylinder including gas defining means having a diameter for permitting the rising speed of the unreacted chlorine gas within the hollow cylinder to be higher than the precipitating speed of the formed chlorine hydrate crystals, said gap defining means forming a predetermined gap between the hollow cylinder and the gas supply pipe for enabling substantially all said chlorine hydrate crystals to rise within said predetermined gap for discharge from said upper opening to be deposited in the tank only outside said hollow cylinder and out of contact with the gas supply pipe in the vicinity of said distal end.

2. A chlorine hydrate tank according to claim 1, wherein a cooling heat exchanger is arranged at an upper portion of the chlorine hydrate tank, and a heating heat exchanger is arranged at a lower portion of the chlorine hydrate tank.

3. A chlorine hydrate tank according to claim 1, wherein the lower end of the hollow cylinder has a funnel-like shape.

4. A chlorine hydrate tank according to claim 1, wherein the upper opening in said hollow cylinder is formed in the sidewall of said hollow cylinder.

5. A chlorine hydrate tank according to claim 4, wherein said supporting means includes an upper part of said hollow cylinder above said upper opening.

* * * * *